(12) United States Patent
McCarthy

(10) Patent No.: US 7,306,836 B2
(45) Date of Patent: *Dec. 11, 2007

(54) BLACK FOOD CONTAINERS

(75) Inventor: Donald C. McCarthy, Appleton, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/405,377

(22) Filed: Apr. 2, 2003

(65) Prior Publication Data

US 2003/0190443 A1    Oct. 9, 2003

Related U.S. Application Data

(60) Provisional application No. 60/370,494, filed on Apr. 5, 2002.

(51) Int. Cl.
| B29D 22/00 | (2006.01) |
| B29D 23/00 | (2006.01) |
| B32B 1/08  | (2006.01) |

(52) U.S. Cl. ............... 428/35.7; 428/34.1; 428/320.2; 428/321.3; 428/324; 428/500

(58) Field of Classification Search ............... 428/36.7, 428/34.1, 36.5, 36.6, 36.8, 320.2, 321.3, 428/324, 500; 220/23, 86, 780, 781, 501

See application file for complete search history.

(56) References Cited

U.S. PATENT DOCUMENTS

| 4,477,608 | A | * | 10/1984 | Babler et al. ............... 523/215 |
| 5,192,609 | A | * | 3/1993 | Carroll, Jr. .................. 428/328 |
| 6,100,512 | A | | 8/2000 | Neculescu et al. .......... 219/725 |
| 6,211,500 | B1 | | 4/2001 | Cochran, II et al. ........ 219/725 |
| 6,211,501 | B1 | | 4/2001 | McCarthy et al. .......... 219/725 |
| 6,733,852 | B2 | | 5/2004 | Littlejohn et al. .......... 428/35.7 |
| 6,866,905 | B1 | * | 3/2005 | Sandstrom et al. ........ 428/34.1 |
| 2002/0037378 | A1 | * | 3/2002 | Littlejohn et al. .......... 428/36.5 |

FOREIGN PATENT DOCUMENTS

| EP | 0 243 206 A2 | 10/1987 |
| EP | 0 311 723 A1 | 4/1989 |
| EP | 0714939 A2 * | 6/1996 |
| JP | 53-84044 | 12/1976 |
| JP | 59-209520 | 5/1983 |

OTHER PUBLICATIONS

Related European Patent Application No. 98 306 400.7 Examination Report dated Dec. 21, 2006.

* cited by examiner

*Primary Examiner*—Michael Miggins
(74) *Attorney, Agent, or Firm*—Joel T. Charlton

(57) ABSTRACT

A black pigmented disposable food container is preferably made from a polypropylene matrix polymer, optionally including polyethylene and further includes a mineral filler and a black colorant composition consisting essentially of a black iron oxide pigment and a green pigment.

28 Claims, 2 Drawing Sheets

BLACK FOOD CONTAINERS

CLAIM FOR PRIORITY

This non-provisional application claims the benefit of the filing date of U.S. Provisional Patent Application Ser. No. 60/370,494, of the same title, filed Apr. 5, 2002.

TECHNICAL FIELD

The present invention relates generally to disposable food containers and more particularly to black pigmented thermoformed food containers.

BACKGROUND

Thermoformed plastic containers, particularly polypropylene mica-filled containers with a micronodular surface are disclosed in U.S. Pat. No. 6,100,512 to Neculescu et al. Such containers have the advantages that they are durable and may be washed and re-used if so desired and are microwaveable.

A preferred color for plates, platters, bowls and the like is black which oftentimes is achieved by way of using carbon black pigments. It has been found that thermoplastic compositions containing carbon black pigments do not exhibit optimal color fastness at elevated temperatures, particularly in the presence of oils, grease and the like. Inorganic pigments, on the other hand, tend to be relatively expensive and do not provide sufficient color density at low loadings in a polymer matrix.

SUMMARY OF INVENTION

It has been found in accordance with the present invention that an iron oxide black/green pigment mixture provides sufficient color density at low concentrations in a polymer matrix and also resists extraction by organic solvents, even at elevated temperatures.

There is thus provided in accordance with the present invention a thermoformed disposable food container formed from a thermoplastic sheet material pigmented black with a colorant composition consisting essentially of a black iron oxide pigment and a green pigment, wherein the black iron oxide pigment is present in an amount of up to about 5 weight percent of the container. Generally, the weight ratio of black iron oxide pigment to green pigment is at least about 10:1, and a preferred green pigment is phthalocyanine green (also known as Green Pigment 7).

The thermoplastic sheet material may include a polymer selected from the group consisting of polyesters, polystyrenes, polypropylenes, polyethylenes, polyamides, polyacrylates, polysulfones, polyetherketones, polycarbonates, acrylics, polyphenylene sulfides, acetals, polyetherimides, polyphenylene ethers or oxides, styrene-maleic anhydride copolymers, styrene-acrylonitrile copolymers, polyvinylchlorides and mixtures thereof; and may be a mineral-filled thermoplastic sheet material. A preferred filler for mineral-filled thermoplastic sheet material is mica. In a particularly preferred case, the mineral-filled thermoplastic sheet material contains less than about 0.25 weight percent titanium dioxide, and most preferably contains no titanium dioxide.

Titanium-dioxide free compositions require less pigment to achieve the desired black color density and exhibit the added benefit of less die-lip buildup during extrusion of the sheet. In such cases, black oxide pigment is present in an amount of less than 3 percent by weight of the container.

In most cases, the black iron oxide pigment is present in an amount of less than 4 weight percent of the container, while generally the container has a wall caliper of from about 10 to about 50 mils, and typically has a wall caliper of from about 15 to about 25 mils.

A preferred thermoformed disposable food container is made from a black-pigmented, mineral-filled polypropylene sheet comprising from about 30 to about 80 percent by weight of a matrix polymer composition consisting predominantly of a polypropylene polymer and optionally including a polyethylene polymer, from about 10 to about 60 weight percent of a mineral filler, wherein the container is pigmented with a black colorant composition consisting essentially of a black iron oxide pigment and a green pigment, and wherein the black iron oxide pigment is present in an amount of up to about 5 weight percent of the container.

Typically, a preferred thermoformed disposable food container contains from about 20 to about 40 weight percent mica, from about 2.5 to about 25 weight percent calcium carbonate, and less than 4 weight percent black iron oxide pigment. Especially preferred are compositions containing less than about 0.25 weight percent titanium dioxide, or those containing no titanium dioxide. Such a composition may contain from about 1 weight percent to about 3 weight percent of a black iron oxide pigment, and typically less than about 3 weight percent of a black iron oxide pigment. About 2 weight percent of a black iron oxide pigment is a preferred iron oxide pigment loading.

An especially preferred matrix polymer composition consists of a polypropylene polymer and a polyethylene polymer, wherein the polyethylene polymer is present in an amount of from about 1 to about 15 percent by weight of the container, with polyethylene being present from about 2.5 to about 7.5 percent by weight of the container in many cases. A preferred polyethylene polymer is HDPE. The polypropylene polymer usually is present in an amount of from about 40 to about 60 percent by weight of the container and may be isotactic polypropylene when a polypropylene embodiment of the invention is employed.

BRIEF DESCRIPTION OF DRAWINGS

The invention is described in detail below with reference to the various drawings. In the drawings.

DETAILED DESCRIPTION

Figure 1:
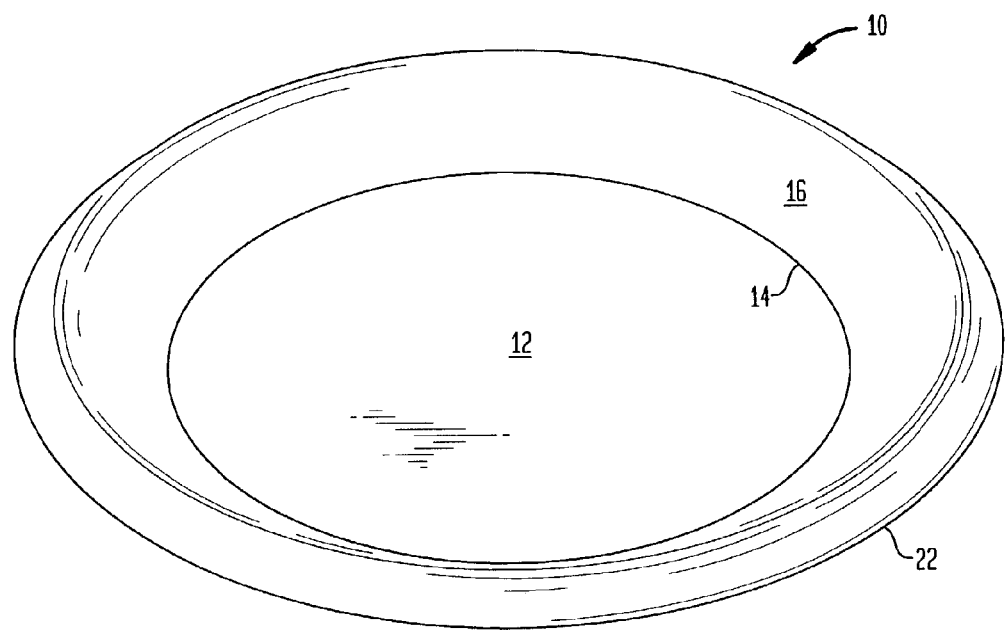
FIG. 1 is a view in perspective of a plate constructed in accordance with the present invention.

The invention is described in detail below with reference to the figures. Such description is for purposes of illustration only and is not limitative of the invention in any way. Numerous modifications within the spirit and scope of the present invention, set forth in the appended claims, will be readily apparent to those of skill in the art.

Definitions and Materials

Unless otherwise specified, the following terms have the following meanings:

"Sheet", "sheet stock" and the like refers to both a web or roll of material and to material that is cut into sheet form for processing.

Unless otherwise indicated, "mil", "mils" and like terminology refers to thousandths of an inch and dimensions appear in inches. Likewise, caliper is the thickness of material and is expressed in mils unless otherwise specified.

The term major component, predominant component and the like refers to a component making up at least about 50% of a composition or that class of compound in the composition by weight as the context indicates; for example, a filler is the predominant filler in a filled plastic composition if it makes up more than about 50% by weight of the filler in the composition based on the combined weight of fillers in the composition, and a resin is the predominant resin in a composition if it makes up more than 50 percent of the resin in the composition.

Percents refer to weight percents.

The thermoplastic material may be a filled or unfilled material including a polymeric material selected from the group consisting of: polyamides, polyacrylates, polysulfones, polyetherketones, polycarbonates, acrylics, polyphenylene sulfides, acetals, polyetherimides, polyphenylene ethers or oxides, styrene-maleic anhydride copolymers, styrene-acrylonitrile copolymers, polyvinylchlorides and mixtures thereof. A preferred thermoplastic material comprises a foamed or solid polymeric material selected from the group consisting of: polyesters, polystyrenes, polypropylenes, polyethylenes and mixtures thereof. In preferred embodiments, the container is made from a mineral-filled polypropylene sheet.

Polypropylene polymers which are suitable are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5.

A polyethylene polymer or component may be any suitable polyethylene such as HDPE, LDPE, MDPE, LLDPE or mixtures thereof and may be melt-blended with polypropylene if so desired. The various polyethylene polymers referred to herein are described at length in the *Encyclopedia of polymer Science & Engineering* (2d Ed.), Vol. 6; pp: 383-522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

Mineral fillers include mica, talc, kaolin, bentonite, wollastonite, glass in its various forms such as milled or unmilled glass fiber, glass beads (solid or hollow), silica, or silicon carbide whiskers and the like or mixtures thereof. Polypropylene compositions of the invention may be melt-compounded compositions with acidic-type mineral fillers such as mica, as well as other mineral fillers such as calcium carbonate, talc, barium sulfate, calcium sulfate, magnesium sulfate, clays, glass, dolomite, alumina, ceramics, silica, and so forth. Many of these materials are enumerated in the *Encyclopedia of Materials Science and Engineering*, Vol. # 3, pp. 1745-1759, MIT Press, Cambridge, Mass. (1986), the disclosure of which is incorporated herein by reference. Combinations of fillers are preferred in some embodiments.

Black iron oxide pigment and the like terminology refers to iron oxide based black pigments optionally including oxides of other metals as is known and disclosed, for example, in U.S. Pat. Nos. 6,235,106; 5,154,769 and 4,090,888, incorporated herein by reference.

Green pigment means and includes, but is not limited to, phthalocyanine green pigment also known in the art as Green 7 pigment.

"Thermoforming", "thermoformed" and like terminology is given its ordinary meaning. In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap. In some preferred embodiments, the melt-compounded composition from which the articles are made may include polypropylene and optionally further includes a polyethylene component and titanium dioxide. Suitable materials and techniques for fabricating the disposable containers of the present invention from thermoplastic materials appear in U.S. Pat. No. 6,211,501 to McCarthy et al. as well as U.S. Pat. No. 6,211,500 to Cochran II et al. the disclosures of which are incorporated herein by reference.

EXAMPLE 1 AND COMPARATIVE EXAMPLES A AND B

Melt-compounded and extruded sheet material was prepared using a polypropylene/polyethylene matrix polymer composition, mica and calcium carbonate filler having generally the compositions listed in Table 1, wherein the component sources is listed below:

Polypropylene—Exxon PP 4772 (and minor amounts of PP Carrier resin)
HDPE—Exxon HD-7845
Mica—Franklin L-140
Calcium Carbonate—Huber Hubercarb 325
Titanium dioxide—Kronos 2073 or Trioxide TR 23
Carbon black—Schulman Polyblack 4601 FDA black dispersion, includes matrix polymer
Iron oxide black pigment—Bayer Iron oxide black 318 M
Phthalocyanine green pigment—Sun Chemical 264-8142

TABLE 1

| | Compositions | |
| | Weight Percent | |
| Component | Examples A, B | Example 1 |
|---|---|---|
| Polypropylene | 51.5 | 51.75 |
| HDPE | 4 | 4 |
| Mica | 30 | 30 |
| Calcium Carbonate | 10 | 10 |

TABLE 1-continued

| Component | Compositions Weight Percent | |
|---|---|---|
| | Examples A, B | Example 1 |
| Titanium Dioxide (White) | 0.5 | 0.5 |
| Carbon Black | 4* | — |
| Green Phthalocyanine Pigment | — | 0.25 |
| Iron Oxide Black | — | 3.5 |

*includes matrix polymer

Examples 1, A and B were generally of the same black color density and were prepared using FDA carbon black (Schulman Polyblak 4601) at 4 wt. %. Example B was provided with a polypropylene cap layer (1 mil) and then all samples were tested for extractables as detailed in Table 2 below.

TABLE 2

Extraction Data for Polypropylene Compositions

| | Extractables (mg/in$^2$) | | |
|---|---|---|---|
| Sample | Water 212° F. 2 hours | Heptane 150° F. 2 hours | Heptane 120° F. 30 minutes |
| Example 1- Non-carbon black* | 0.04 | 0.25 | 0.06 |
| Example A- Carbon black | 0.03 | 0.37 | 0.13 |
| Example B- Carbon black with PP cap layer | <0.01 | 0.34 | 0.10 |

*Black Iron Oxide Pigment, 3.5 percent

It will be appreciated from Table 2 that the extractables observed with heptane were much higher with the carbon black examples, especially with respect to the second heptane test. This was so even when a cap layer of 1 mil thickness polypropylene was employed. These characteristics are consistent with cooking tests where the carbon black pigment was found to leach into bacon grease and discolor the food.

EXAMPLES 2, 3, C

It was further found in accordance with the invention that the amount of pigment required could be greatly reduced if titanium dioxide was eliminated from the composition. In this respect, there is shown in Table 3 three generally equivalent color density compositions, wherein the amount of black iron oxide pigment can be reduced by about 40% simply by eliminating the titanium dioxide. The various components used for the compositions of Table 3 are the same as those listed above.

TABLE 3

Equivalent Color Density Black Polypropylene Compositions

| | Weight Percent | | |
|---|---|---|---|
| Component | Example C | Example 2* | Example 3** |
| Polypropylene | 51.5 | 51.75 | 53.86 |
| HDPE | 4 | 4 | 4 |
| Mica | 30 | 30 | 30 |
| Calcium Carbonate | 10 | 10 | 10 |
| Titanium Dioxide (White) | 0.5 | 0.5 | 0 |
| Carbon Black | 4*** | — | — |
| Green Organic Pigment | — | 0.25 | 0.14 |
| Iron Oxide Black | — | 3.5 | 2 |

*Formulated with 60.69% pigment PP Concentrate
**Formulated with 53.55% pigment PP Concentrate
***Includes matrix polymer

PREFERRED EMBODIMENTS

In general, products of the invention are made by first extruding a polypropylene sheet of suitable composition as described in the '500 and '501 patents followed by thermoforming the sheet as is also described in the '500 and '501 patents. Various components are further enumerated in pending U.S. patent application Ser. No. 09/921,264, entitled "Disposable Serving Plate With Sidewall-Engaged Sealing Cover", filed Aug. 2, 2001. A suitable container shape is that described in U.S. Co-Pending application Ser. No. 09/603,579, filed Jun. 26, 2000, entitled "Smooth Profiled Food Service Articles", These plates have the characteristics seen in FIGS. 1-3 below and in Tables 4-6.

Figure 2:
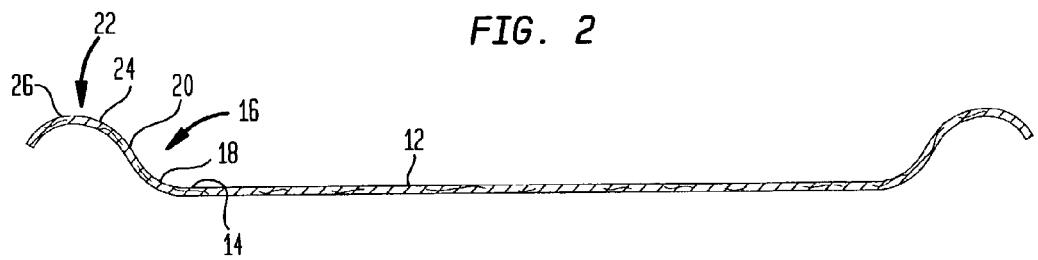
FIG. 2 is a view in cross-section and elevation of the plate of FIG. 1 illustrating the profile of the plate.
Figure 3:
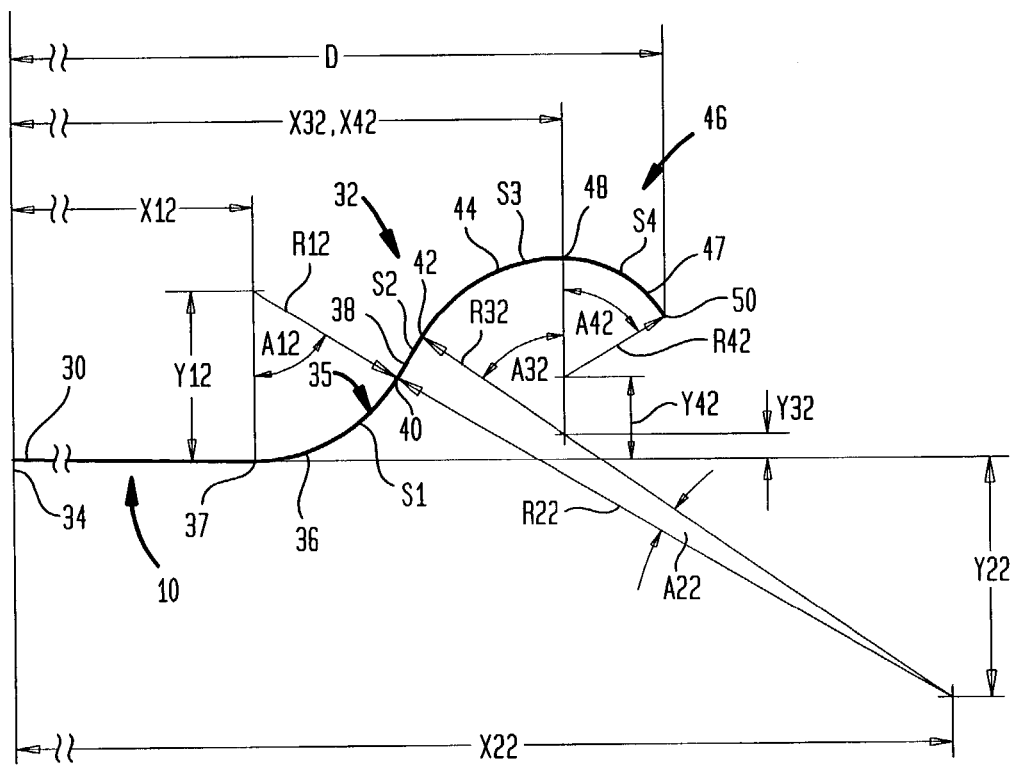
FIG. 3 is a schematic diagram illustrating the various dimensions of the plate of FIGS. 1 and 2.

Illustrated in FIGS. 1 through 3, there is a plate 10 which includes a planar center 12 which, in turn, includes an outer peripheral surface 14. This center region 12 may have a slight convex crown to improve plate stability during use. The planar center 12 forms a bottom for the plate 10. An outwardly projecting sidewall 16 includes a first rim portion 18 which is joined to the outer peripheral surface 14 of the planar center 12. A second rim portion 20 is joined to the first rim portion 18. The first rim portion 18 and the second rim portion 20 form the outwardly projecting sidewall 16 which forms the sidewall of the plate 10. A rim 22 includes a third rim portion 24 which is joined to the second rim portion 20 of the outwardly projecting sidewall 16. A fourth rim portion 26 is joined to the third rim portion 24. The fourth rim portion 26 forms the outer edge of the plate 10.

FIG. 3 illustrates a partial cross-sectional view of a plate, diameter D, according to the present invention. The plate 10 defines a center line 34. A base or bottom-forming portion 30 extends from the center line 34 to an outer peripheral portion 32.

From the center line 34 a predetermined distance X12 extends toward the outer peripheral surface forming portion 32. A distance Y12 extends a predetermined distance from the base or bottom-forming portion 30 upwardly therefrom. A radius R12 extends from the intersection point of the distance X12 and Y12 to form a first rim portion 36 of the outwardly projecting sidewall 35. The first rim portion 36 is defined by an arc A12 which extends from a substantially vertical line defined at an outer peripheral point 37 to a fixed point 40. The arc A12 may be approximately 60°.

A distance X22 extends from the center line 34 to a predetermined point. A distance Y22 extends from the base or bottom-forming portion 30 of the plate 10 downwardly a predetermined distance. A radius R22 extends from the intersection of the lines X22 and Y22 to define the radius of curvature of a second rim portion 38 of the sidewall 35. The radius R22 extends from the first fixed point 40 to the second fixed point 42 through an arc A22. The arc A22 may be approximately 4°.

A distance X32 extends from the center line 34 to a predetermined distance. A distance Y32 extends from the base or bottom-forming section 30 of the plate 10 to project upwardly a predetermined distance. A radius R32 extends from the intersection of the lines X32 and Y32 which is the radius of the third rim portion 44 of the rim 46. The radius R32 extends from the second fixed point 42 to a third fixed point 48. An arc A32 is formed between the second fixed point 44 and the third fixed point 48 to extend a predetermined distance. The arc A32 may be approximately 55°.

A distance X42 extends a predetermined distance from the center line 34. Similarly, a distance Y42 extends from the base or bottom-forming section 30 of the plate 10 to project upwardly. A radius R42 extends from the intersection of the lines X42 and Y42 to define the radius of curvature of a fourth rim portion 47 of the rim 46. An arc A42 is formed between the third fixed point 48 and a fourth fixed point 50 at diameter D from the center line. The arc A42 may be approximately 60°. A section disposed at 50 forms the outer edge of the plate.

The article made according to the present invention may have any particular size or shape. In various embodiments of the present invention the container may be a 9" or 11" plate with profile coordinates as illustrated in FIGS. 1 through 3 having the dimensions, angles, or relative dimensions enumerated in Tables 4 through 6.

TABLE 4

Dimensions and Angles For 9" Plate

| DIMENSION and ANGLES | VALUE (inches or degrees) |
|---|---|
| R12 | 0.537 |
| X12 | 3.156 |
| Y12 | 0.537 |
| R22 | 2.057 |
| X22 | 5.402 |
| Y22 | 0.760 |
| R32 | 0.564 |
| X32 | 4.167 |
| Y32 | 0.079 |
| R42 | 0.385 |
| X42 | 4.167 |
| Y42 | 0.258 |
| A12 | 60.00° |
| A22 | 4.19° |
| A32 | 55.81° |
| A42 | 60.00° |
| D | 9.00 |
| BOTTOM CONVEX CROWN | 0.06 |

TABLE 5

Dimensions and Angles For 11' PLATE

| DIMENSION/ANGLES | VALUE (inches or degrees) |
|---|---|
| R12 | 0.656 |
| X12 | 3.857 |
| Y12 | 0.656 |
| R22 | 2.514 |
| X22 | 6.602 |
| Y22 | 0.929 |
| R32 | 0.689 |
| X32 | 5.093 |
| Y32 | 0.097 |
| R42 | 0.470 |
| X42 | 5.093 |
| Y42 | 0.315 |

TABLE 5-continued

Dimensions and Angles For 11' PLATE

| DIMENSION/ANGLES | VALUE (inches or degrees) |
|---|---|
| A12 | 60.00° |
| A22 | 4.19° |
| A32 | 55.81° |
| A42 | 60.00° |
| D | 11.00 |
| BOTTOM CONVEX CROWN | 0.06 |

TABLE 6

Dimensions For 9" and 11" PLATES

| DIMENSION RATIO OR ANGLE | VALUES (Dimensionless or degrees) | | |
|---|---|---|---|
| | PREFERRED | MINIMUM | MAXIMUM |
| R12/D | 0.060 | 0.045 | 0.075 |
| X12/D | 0.351 | 0.280 | 0.420 |
| Y12/D | 0.060 | 0.045 | 0.075 |
| R22/D | 0.228 | 0.180 | 0.275 |
| X22/D | 0.600 | 0.480 | 0.720 |
| Y22/D | 0.084 | 0.065 | 0.100 |
| R32/D | 0.063 | 0.050 | 0.075 |
| X32/D | 0.463 | 0.370 | 0.555 |
| Y32/D | 0.009 | 0.007 | 0.011 |
| R42/D | 0.043 | 0.034 | 0.052 |
| X42/D | 0.463 | 0.370 | 0.555 |
| Y42/D | 0.029 | 0.023 | 0.035 |
| A12 | 60.00° | 55.00° | 75.00° |
| A22 | 4.19° | 1.00° | 10.00° |
| A32 | 55.81° | 45.00° | 75.00° |
| A42 | 60.00° | 45.00° | 75.00° |

Salient features of the plate illustrated in FIGS. 1 through 3 generally include a substantially planar center portion (which may be crowned as noted above and illustrated throughout the various figures) with four adjacent rim portions extending outwardly therefrom, each rim portion defining a radius of curvature as set forth above and further noted below. The first rim portion extends outwardly from the planar center portion and is convex upwardly as shown. There is defined by the plate a first arc A12 with a first radius of curvature R12 wherein the arc has a length S1. A second rim portion is joined to the first rim portion and is downwardly convex, defining a second arc A22, with a radius of curvature R22 and a length S2. A third, downwardly convex, rim portion is joined to the second rim portion and defines another arc A32. There is defined a third radius of curvature R32 and a third arc length S3. A tangent to the third arc at the upper portion thereof is substantially parallel to the planer center portion as shown in FIG. 2. A fourth rim portion is joined to the third rim portion, which is also downwardly convex. The fourth rim portion defines a fourth arc A42 with a length S4, with a radius of curvature R42.

The length of the second arc, S2 is generally less the length of the fourth arc S4, which, in turn, is less than the length S1 of the first arc A12. The radius of curvature R42 of the fourth arc is less than the radius of curvature R32 of the third rim portion, which in turn, is less than radius of curvature R22 of the second rim portion. The angle of the first arc, A12 is generally greater that about 55 degrees, while, the angle of the third arc, A32 is generally greater than about 45 degrees as is set forth in the foregoing tables. The angle of the fourth arc A42 is generally less than about 75 degrees and more preferably is about 60 degrees.

Typically, the length S1 of arc A12 is equivalent to the length S3 of arc A32 and R12 of the first rim portion is equivalent in length to the radius of curvature R32 of the third rim portion.

Generally speaking, the height of the center of curvature of the first arc (that is the origin of ray R12) above the central planar portion is substantially less than, perhaps twenty five percent or so less than, the distance that the center of curvature of the second rim portion (the origin of ray R22) is below the central planar portion. In other words, the length Y12 is about 0.75 times or less the length Y22.

So also, the horizontal displacement of the center of curvature of the second rim portion from the center of curvature of the first rim portion is at least about twice the length of the first radius of curvature R12. The height of the center of curvature of the third rim portion above the central planar portion is generally less than the height of the center of curvature of the fourth rim portion above the plane of the central planar portion. The horizontal displacement of the center of curvature of the second rim portion is generally outwardly disposed from the center of curvature of the third and fourth rim portions. A further noteworthy feature of the plate of FIGS. 1 through 3 is that the height of the center of curvature of the third rim portion above the planar central portion is less than about 0.3 times the radius of curvature R42 of the fourth rim portion; while the height of the center of curvature of the fourth rim portion above the plane of the central portion is at least about 0.4 times the first radius of curvature R12.

The invention has been described in detail hereinabove in connection with numerous embodiments. That discussion is not intended to limit in any way the scope of the present invention which is defined in the appended claims. It will be readily appreciated by one of skill in the art that the particular embodiments illustrated may be scaled up or down in size with the relative proportions shown herein or that product shapes such as square or rectangular with rounded corners, triangular, multi-sided, oval platters, polygonal platters with rounded corners and the like may be formed in accordance with the present invention. Typical products include plates, bowls, trays, deep dish containers, platters and so forth.

What is claimed is:

1. A thermoformed disposable food container formed from a thermoplastic sheet material comprising polypropylene, wherein the sheet is pigmented black with a colorant composition consisting essentially of a black iron oxide pigment and phthalocyanine green, the weight ratio of black iron oxide pigment to phthalocyanine green being at least about 10:1 and said black iron oxide pigment is present in an amount of up to about 5 weight percent of the container, and wherein further the sheet material exhibits a lower extractables content in heptane compared to a like sheet material pigmented black with carbon black.

2. The thermoformed disposable food container according to claim 1, wherein said black iron oxide pigment is present in an amount of less than 4 weight percent of said container.

3. The thermoformed disposable food container according to claim 1, wherein said polypropylene is melt-blended with said colorant composition.

4. The thermoformed disposable food container according to claim 1, wherein said thermoplastic sheet material further comprises a polymer selected from the group consisting of polyesters, polystyrenes, polyethylenes, polyamides, polyacrylates, polysulfones, polyetherketones, polycarbonates, acrylics, polyphenylene sulfides, acetals, polyetherimides, polyphenylene ethers or oxides, styrene-maleic anhydride copolymers, styrene-acrylonitrile copolymers, polyvinylchlorides and mixtures thereof.

5. The thermoformed disposable food container according to claim 4, wherein said thermoplastic sheet material is a mineral-filled thermoplastic sheet material.

6. The thermoformed disposable food container according to claim 5, wherein said mineral-filled thermoplastic sheet material includes mica.

7. The thermoformed disposable food container according to claim 1, wherein said thermoplastic sheet material contains less than about 0.25 weight percent titanium dioxide.

8. The thermoformed disposable food container according to claim 7, wherein said mineral-filled thermoplastic sheet material contains no titanium dioxide.

9. The thermoformed disposable food container according to claim 8, wherein said black iron oxide pigment is present in an amount of less than 3 percent by weight of said container.

10. The thermoformed disposable food container according to claim 1, having a wall caliper of from about 10 to about 50 mils.

11. The thermoformed disposable food container according to claim 10, having a wall caliper of from about 15 to about 25 mils.

12. A thermoformed disposable food container made from a black-pigmented, mineral-filled polypropylene sheet comprising from about 30 to about 80 percent by weight of a matrix polymer composition comprising a polypropylene polymer and optionally including a polyethylene polymer, from about 10 to about 60 weight percent of a mineral filler, wherein said container is pigmented with a black colorant composition consisting essentially of a black iron oxide pigment and phthalocyanine green, the weight ratio of black iron oxide pigment to phthalocyanine green is at least about 10:1, and said black iron oxide pigment is present in an amount up to about of 5 weight percent of said container, and wherein further the sheet material exhibits a lower extractables content in heptane compared to a like sheet material pigmented black with carbon black.

13. The thermoformed disposable food container according to claim 12, containing less than 4 weight percent black iron oxide pigment.

14. The thermoformed disposable food container according to claim 12, wherein said matrix polymer composition is melt-blended with said colorant composition.

15. The thermoformed disposable food container according to claim 12, containing less than about 0.25 weight percent titanium dioxide.

16. The thermoformed disposable food container according to claim 15, containing no titanium dioxide.

17. The thermoformed disposable food container according to claim 16, wherein said composition contains from about 1 weight percent to about 3 weight percent of a black iron oxide pigment.

18. The thermoformed disposable food container according to claim 16, containing less than about 3 weight percent of a black iron oxide pigment.

19. The thermoformed disposable food container according to claim 16, containing about 2 weight percent of a black iron oxide pigment.

20. The thermoformed disposable food container according to claim 12, wherein said matrix polymer composition consists of a polypropylene polymer and a polyethylene polymer.

21. The thermoformed disposable food container according to claim 20, wherein said polyethylene polymer is present in an amount of from about 1 to about 15 percent by weight of said container.

22. The thermoformed disposable food container according to claim 21, wherein said polyethylene polymer composition is present in an amount of from 2.5 to about 7.5 percent by weight of said container.

23. The thermoformed disposable food container according to claim 22, wherein said polyethylene polymer is HDPE.

24. The thermoformed disposable food container according to claim 12, wherein said polypropylene polymer is present in an amount of from about 40 to about 60 percent by weight of said container.

25. The thermoformed disposable food container according to claim 24, wherein said polypropylene polymer is isotactic polypropylene.

26. The thermoformed disposable food container according in claim 12, having a wall caliper of from about 10 to about 50 mils.

27. The thermoformed disposable food container according to claim 26, having a wall caliper of from about 15 to about 25 mils.

28. A thermoformed disposable food container made from a black-pigmented, mineral-filled polypropylene sheet comprising from about 30 to about 80 percent by weight of a matrix polymer composition comprising a polypropylene polymer and optionally including a polyethylene polymer, from about 20 to about 40 weight percent of a mineral filler, wherein said container is pigmented with a black colorant composition consisting essentially iron black iron oxide pigment and a phthalocyanine green pigment, wherein said black iron oxide pigment is present in an amount of up to about 5 weight percent of said container, and wherein the thermoformed disposable food container further comprises from about 2.5 to about 25 weight percent calcium carbonate and from about 20 to about 40 weight percent mica.

* * * * *